(12) United States Patent
Kaku

(10) Patent No.: US 12,244,779 B2
(45) Date of Patent: Mar. 4, 2025

(54) IMAGE FORMING APPARATUS

(71) Applicant: SHARP KABUSHIKI KAISHA, Sakai (JP)

(72) Inventor: Yuichi Kaku, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 18/413,373

(22) Filed: Jan. 16, 2024

(65) Prior Publication Data

US 2024/0251048 A1 Jul. 25, 2024

(30) Foreign Application Priority Data

Jan. 19, 2023 (JP) .................. 2023-006760

(51) Int. Cl.
G06K 15/00 (2006.01)
H04N 1/00 (2006.01)

(52) U.S. Cl.
CPC ..... *H04N 1/00896* (2013.01); *H04N 1/00087* (2013.01); *H04N 1/00413* (2013.01)

(58) Field of Classification Search
CPC ........... H04N 1/00896; H04N 1/00928; H04N 1/00891; H04N 1/00087; H04N 1/00413
See application file for complete search history.

(56) References Cited

U.S. PATENT DOCUMENTS

| | | | |
|---|---|---|---|
| 2003/0074501 A1* | 4/2003 | Anzai | G06K 15/00 710/72 |
| 2014/0320904 A1* | 10/2014 | Ikebata | H04N 1/00 358/1.15 |
| 2018/0288258 A1* | 10/2018 | Judd | H04N 1/00307 |
| 2023/0015377 A1* | 1/2023 | Ito | G03G 15/043 |

FOREIGN PATENT DOCUMENTS

| | | |
|---|---|---|
| JP | 2009-265374 A | 11/2009 |
| JP | 2018-167513 A | 11/2018 |

OTHER PUBLICATIONS

IP.com search history (Year: 2024).*
ProQuest search history (Year: 2024).*

* cited by examiner

*Primary Examiner* — Moustapha Diaby
(74) *Attorney, Agent, or Firm* — ScienBiziP, P.C.

(57) ABSTRACT

An image forming apparatus includes: an operation acceptor that accepts an operation; an image former that has, to be switchable, two image formation modes that are a normal mode and a silent mode; one or more controllers; and one or more power-source controllers that control a power source, the power-source controllers transitioning to a predetermined sleep state when the operation acceptor has not accepted an operation for a predetermined standby time, and transitioning to a predetermined shutoff state when the operation acceptor has not accepted an operation for a predetermined sleep time, the controllers control the power-source controllers to transition to the shutoff state when a predetermined first sleep time has elapsed, and after transitioning to the sleep state during the silent mode, the controllers control the power-source controllers to transition to the shutoff state when a predetermined second sleep time has elapsed.

8 Claims, 19 Drawing Sheets

SYSTEM SETTING

☑ SILENT MODE

☑ ENABLE DEPENDING ON THE TIME ZONE

DAY OF WEEK TO BE ENABLED

☐ ■ ■ ■ ■ ■ ☐
SUN MON TUE WED THU FRI SAT

TIME ZONE TO BE ENABLED

START   8  :  30
END    17  :  15

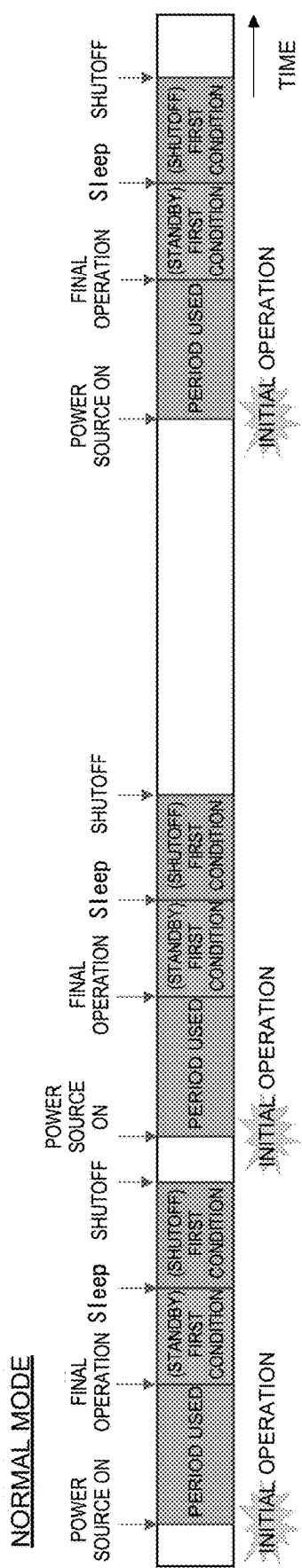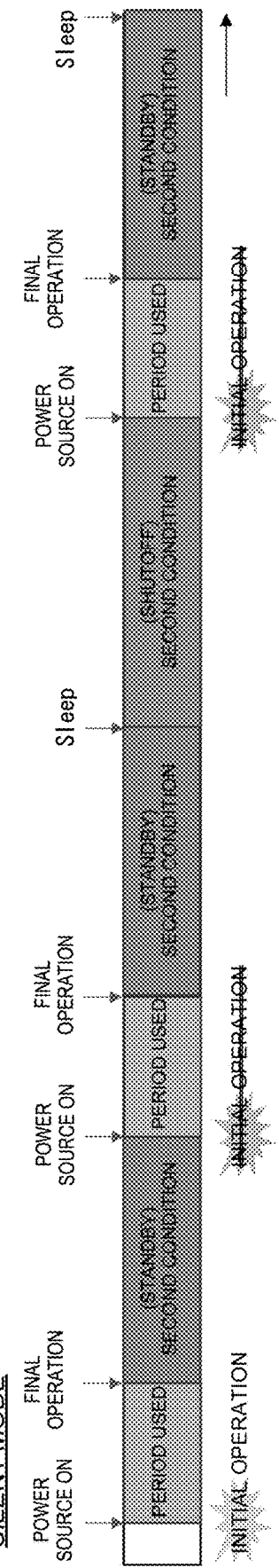

IMAGE FORMING APPARATUS

CROSS-REFERENCE TO RELATED APPLICATION

The present application claims priority from Japanese Application JP2023-006760, the content to which is hereby incorporated by reference into this application.

BACKGROUND OF THE INVENTION

1. Field of the Invention

The present disclosure relates to an image forming apparatus.

2. Description of the Related Art

An image forming apparatus occasionally performs a predetermined initial operation at the time when a power source is turned ON from a shutoff state, so as to check an initial position of each unit or whether an operation is feasible, or to perform an adjusting operation.

Therefore, an operating sound is generated each time a power source of the apparatus is turned ON, which some users near the apparatus find unpleasant.

As an image forming apparatus that restrains such an operating sound, such an image forming apparatus has conventionally been disclosed, which determines whether a sound volume of a surrounding environment of the apparatus itself is equal to or smaller than a pre-set threshold value, based on a sound volume detected by a sound volume detecting unit, and if the sound volume of the surrounding environment is equal to or smaller than the threshold value, stops all or a part of an operating unit that generates an operating sound, thereby being capable of restraining the operating sound when the surrounding environment is brought into a silent state during a period from a start to an end of the operation.

On the other hand, an image forming apparatus is known, which has a power saving mode transition function restraining power consumption by transitioning to a sleep mode when the apparatus is not used for a certain time and activating the apparatus at a predetermined timing.

The image forming apparatus having such a power saving mode transition function occasionally performs an initial operation when having transitioned from the sleep mode to a normal mode.

As an image forming apparatus that restrains the operating sound when having transitioned from the sleep mode to the normal mode, such an image forming apparatus has already been disclosed, which includes a clock that measures a time set for a power saving mode. In the image forming apparatus, when the measured time is smaller than the threshold value, no initial operation is performed in each unit, even if switching from the power saving mode to the normal mode is performed by a mode switcher.

SUMMARY OF THE INVENTION

Some image forming apparatuses have a connection option to perform postprocessing such as punching. Some of the image forming apparatuses that have such a connection option perform an initial operation each time a power source is turned ON.

A conventional method of preventing initial operations for restraining an operating sound in predetermined cases cannot be applied to such an image forming apparatus that performs an initial operation every time a power source is turned ON, which is problematic.

The present disclosure is made in view of the above-described circumstances, and an object thereof is to provide an image forming apparatus in which the number of times in which an operating sound is generated attributed to performance of an initial operation at the time when a power source is turned ON is smaller than in conventional cases, and which is highly useful for users.

The present disclosure discloses an image forming apparatus that includes: an operation acceptor that accepts an operation from a user; an image former that has, to be switchable, two image formation modes that are a normal mode in which image formation is performed at a predetermined speed and a silent mode in which image formation is performed more silently than in the normal mode; one or more controllers that control the image former; and one or more power-source controllers that control a power source from which power is supplied to the image former and the controllers, the power-source controllers transitioning to a predetermined sleep state when the operation acceptor has not accepted an operation for a predetermined standby time, and after transitioning to the sleep state, transitioning to a predetermined shutoff state when the operation acceptor has not accepted an operation for a predetermined sleep time, where after transition to the sleep state is caused during the normal mode, the controllers control the power-source controllers to transition to the shutoff state when a predetermined first sleep time has elapsed, and after transitioning to the sleep state during the silent mode, the controllers control the power-source controllers to transition to the shutoff state when a predetermined second sleep time which is longer than the first sleep time has elapsed.

In the present disclosure, the present disclosure, "image forming apparatus" is an apparatus that forms an image and outputs the image, examples of which include a copier and a compound machine having a copier (copy) function such as a printer that uses an electrophotographic method for image formation by means of toner, or a multifunctional peripheral (MFP) having other functions besides copying.

According to the present disclosure, in the silent mode, a time required to transition from the sleep state to the shutoff state is made longer than in the normal mode. Accordingly, the number of times of generation of an operating sound attributed to performance of an initial operation at the time of the power source being turned ON is reduced than in conventional cases, and the image forming apparatus which is more useful for users than conventionally can be realized.

The following describes further preferred embodiments of the present disclosure.

The image forming apparatus according to an aspect of the present disclosure may be such that the controllers control the power-source controllers to transition to the sleep state when the operation acceptor has not accepted an operation for a predetermined first standby time during the normal mode, and the controllers control the power-source controllers to transition to the sleep state when the operation acceptor has been on standby for a predetermined second standby time which is longer than the first standby time during the silent mode.

By doing so, in the silent mode, not only by making a time required to transition from the sleep state to the shutoff state longer than in the normal mode but also by making a time required to transition from the standby state to the sleep state longer than in the normal mode, the number of times of initial operation attributed to power source being turned ON is reduced. Accordingly, the number of times of generation of an operating sound attributed to performance of the initial operation at the time of the power source being turned ON is reduced than in conventional cases, and the image forming apparatus which is more useful for users than conventionally can be realized.

The image forming apparatus according to an aspect of the present disclosure may be such that it further includes a mode setter that accepts setting of the normal mode and the silent mode, where the controllers control the mode setter to set the second sleep time which is longer than the first sleep time by a predetermined time when the mode setter has accepted setting of the first sleep time, and control the mode setter to set the first sleep time which is shorter than the second sleep time by a predetermined time when the mode setter has accepted setting of the second sleep time.

By doing so, if a user sets a time requited to transition from the sleep state to the shutoff state in the silent mode, a time required to transition from the sleep state to the shutoff state in the normal mode is automatically set. On the other hand, when a user sets the time required to transition from the sleep state to the shutoff state in the normal mode, the time required to transition from the sleep state to the shutoff state in the silent mode is automatically set. Accordingly, the number of times of generation of an operating sound attributed to performance of the initial operation at the time of the power source being turned ON is reduced than in conventional cases, and the image forming apparatus which is more useful for users than conventionally can be realized.

The image forming apparatus according to an aspect of the present disclosure may be such that it further includes a mode setter that accepts setting of the normal mode and the silent mode, where the controllers control the mode setter to be able to accept setting of only the second sleep time which is longer than the first sleep time by a predetermined time when the mode setter has accepted setting of the first sleep time, and control the mode setter to be able to accept setting of only the first sleep time which is shorter than the second sleep time by a predetermined time when the mode setter has accepted setting of the second sleep time.

By doing so, if a user sets a time requited to transition from the sleep state to the shutoff state in the silent mode, a setting range of a time required to transition from the sleep state to the shutoff state in the normal mode is determined. On the other hand, when a user sets the time required to transition from the sleep state to the shutoff state in the normal mode, a setting range of the time required to transition from the sleep state to the shutoff state in the silent mode is determined. Accordingly, the number of times of generation of an operating sound attributed to performance of the initial operation at the time of the power source being turned ON is reduced than in conventional cases, and the image forming apparatus which is more useful for users than conventionally can be realized.

The image forming apparatus according to an aspect of the present disclosure may be such that the operation acceptor includes a power saving key that accepts a predetermined power saving priority instruction, and when the power saving priority instruction is accepted during the silent mode, the controllers control the power-source controllers to transition to the shutoff state when a predetermined third sleep time which is shorter than the first sleep time has elapsed after transitioning to the sleep state.

By doing so, when the power saving priority instruction is accepted in the silent mode, the time required to transition from the sleep state to the shutoff state is shortened. Accordingly, the image forming apparatus which is more useful for users than conventionally can be realized.

The image forming apparatus according to an aspect of the present disclosure may be such that it further includes an error detector that detects an error of the image former, where when the error detector has detected a predetermined error, the controllers control the power-source controllers to transition to the shutoff state when a predetermined fourth sleep time which is shorter than the first sleep time has elapsed after transitioning to the sleep state.

By doing so, when the predetermined error occurs, the time required to transition from the sleep state to the shutoff state is shortened even in the silent mode. Accordingly, the image forming apparatus which is more useful for users than conventionally can be realized.

BRIEF DESCRIPTION OF THE DRAWINGS

FIG. 7 is an explanatory drawing illustrating an example of a setting screen of a time zone of the silent mode of the digital compound machine according to the present disclosure.

FIG. 12A is an explanatory drawing illustrating an example of automatic shutoff transition processing in the normal mode of the digital compound machine, according to the second embodiment of the present disclosure, and FIG. 12B is an explanatory drawing illustrating an example of automatic shutoff transition processing in the silent mode of the digital compound machine, according to the second embodiment of the present disclosure.

DETAILED DESCRIPTION OF THE INVENTION

The following further details the present disclosure with reference to the drawings. Note that the following description is illustrative in every aspect, and is not to be construed to limit the present disclosure.

First Embodiment

Configuration of Digital Compound Machine 1

Figure 1:
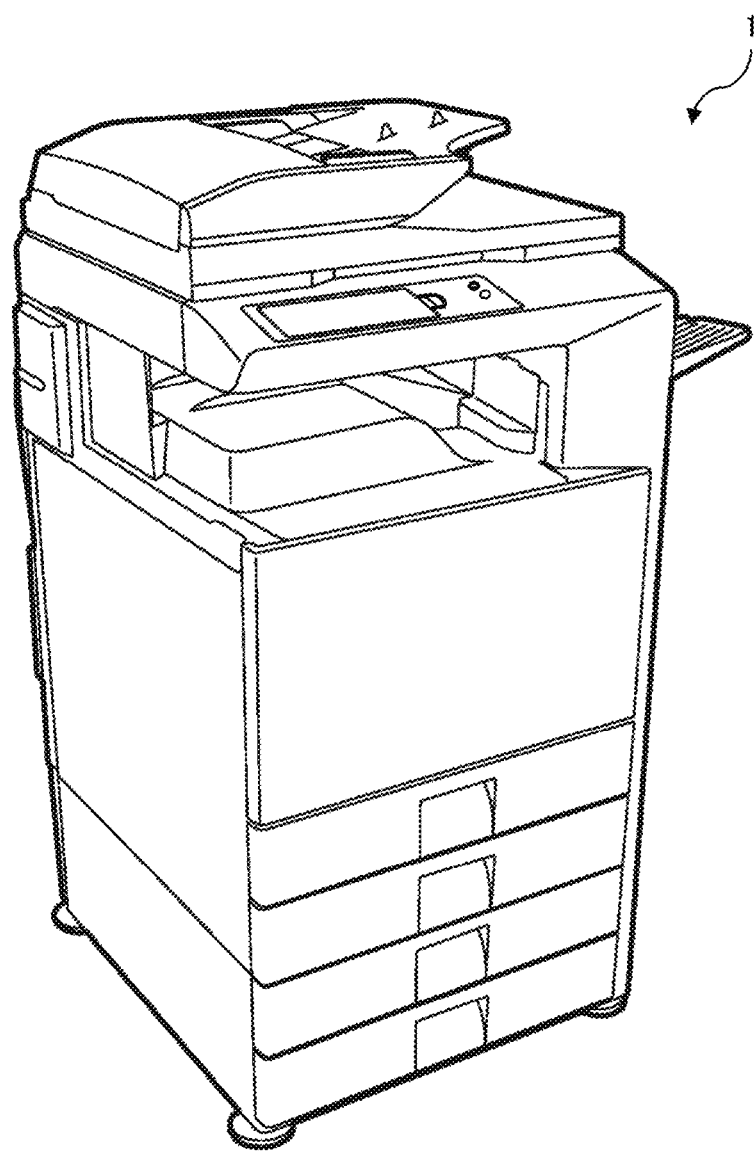
FIG. 1 is a perspective view illustrating an external appearance of a digital compound machine according to the present disclosure.
Figure 2:
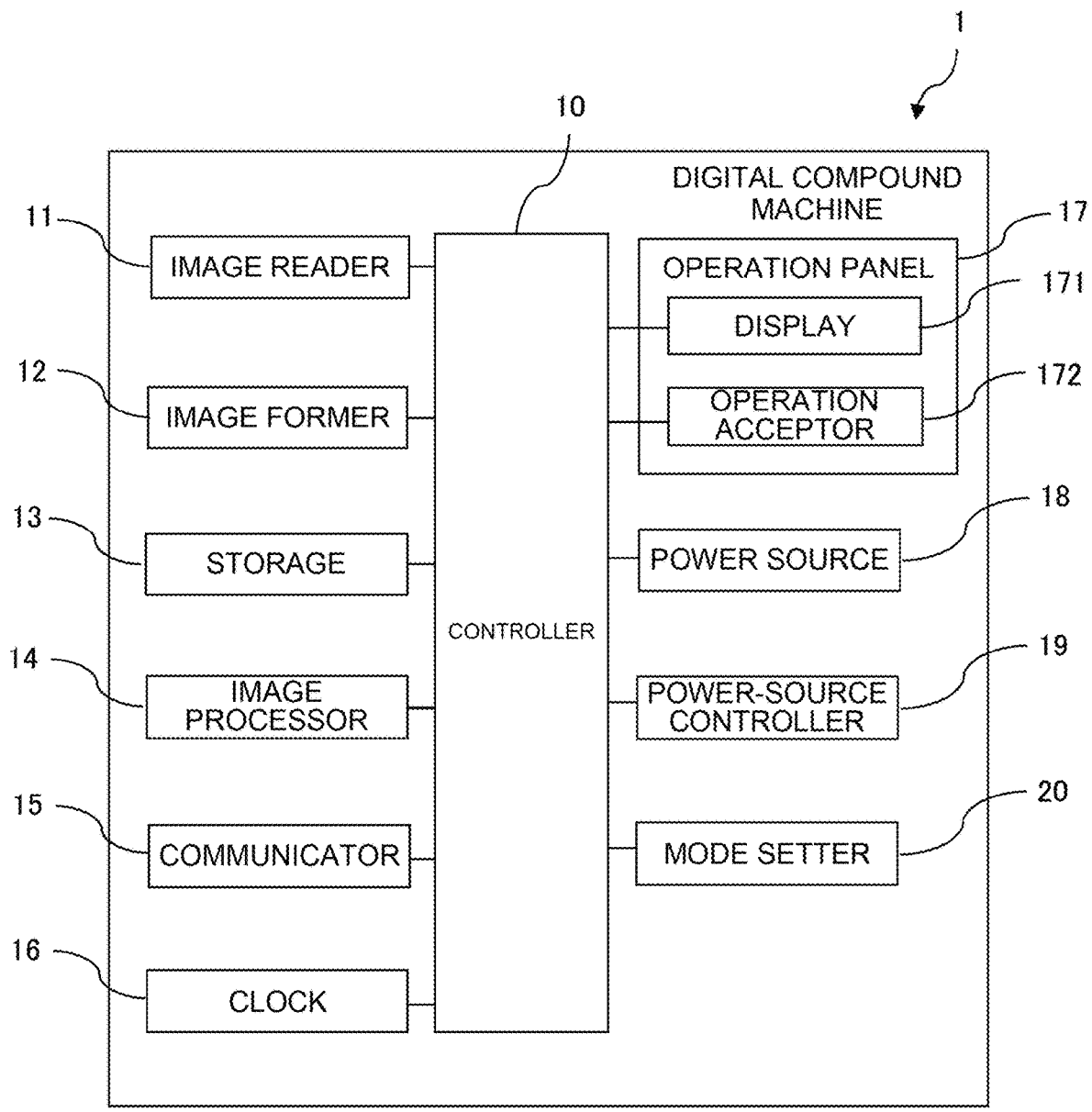
FIG. 2 is a block diagram illustrating an outline of a configuration of the digital compound machine illustrated in FIG. 1.

The following describes a digital compound machine 1, as an example of an image forming apparatus according to a first embodiment of the present disclosure, with reference to FIG. 1 and FIG. 2.

FIG. 1 is a perspective view illustrating an external appearance of a digital compound machine according to the present disclosure.

FIG. 2 is a block diagram illustrating an outline of a configuration of the digital compound machine illustrated in FIG. 1.

The digital compound machine 1 is an apparatus that has a copier function, a scanner function, and a facsimile function, and that performs digital processing on image data read from a document and outputs the result.

As illustrated in FIG. 2, the digital compound machine 1 includes a controller 10, an image reader 11, an image former 12, a storage 13, an image processor 14, a communicator 15, a clock 16, an operation panel 17, a power source 18, a power-source controller 19, and a mode setter 20.

The following describes each constituting element of the digital compound machine 1.

The controller 10 comprehensively controls the digital compound machine 1, and is constituted by one or more central processing units (CPU), a random access memory (RAM), a read only memory (ROM), a various types of interface circuits, and the like.

The controller 10 performs detection of each sensor, and monitoring and control of every load, such as a motor, a clutch, the operation panel 17, or the like, so as to control an entire operation of the digital compound machine 1.

The image reader 11 is a portion that detects and reads either a document placed on a document setting platen or a document having been conveyed from a paper tray, and generates image data.

The image former 12 is a portion that prints and outputs, on a recording medium, the image data generated by the image processor 14.

The image former 12 includes one or more motors to drive the image former 12, and can operate by switching between two image formation modes, depending on types of jobs. The two image formation modes are a normal mode, in which image formation is performed at a predetermined normal motor speed, and a silent mode, in which an operating sound is restrained than in normal cases to reduce a sound and image formation is performed silently. Examples of the silent mode include a silent mode in which image formation is performed at a motor speed which is slower than the normal motor speed, and a silent mode in which the number of times of an operating sound made is reduced.

In addition, the image former 12 performs a predetermined initial operation at the time when a power source is turned ON from a shutoff state, so as to check an initial position of each unit or whether an operation is feasible, or to perform an adjusting operation.

The storage 13 is one or more devices or storage media storing information or control programs necessary for realizing each type of function of the digital compound machine 1. Examples of the storage media include a semiconductor device such as RAM and ROM, a hard disk, a flash storage, and a solid state drive (SSD).

Note that programs and data may be retained in different devices from each other, in such a manner that a region to retain the data is a hard disk drive, and a region to retain the programs is a flash storage.

The image processor 14 is a portion that converts, into an appropriate electric signal, the image of the document read by the image reader 11 and generates image data.

The communicator 15 is a portion that communicates with computers, personal digital assistants, and outside information processing apparatuses and facsimile apparatuses, or the like, via a network, or the like, to transmit and receive various information such as mails and facsimiles to and from these outside communication apparatuses.

The clock 16 is a portion that acquires a time through an internal clock or a network, and measures and counts time.

The operation panel 17 is configured by a display panel configured by a liquid crystal panel, or the like, and a touch panel of an electrostatic capacitance system, or the like, which is displayed by being overlayed on the display panel and detects a position at which a finger has touched. The operation panel 17 includes a display 171 and an operation acceptor 172.

The display 171 is a portion that displays various types of information, and accepts an instruction from a user by means of a touch panel function.

For example, the display 171 is configured by a CRT display, a liquid crystal display, an EL display, or the like, and is a display apparatus, such as a monitor and a line display, on which an operating system or application software displays electronic data, such as processing states. The controller 10 displays an operation and a state of the digital compound machine 1 through the display 171.

The operation acceptor 172 is an interface to operate the digital compound machine 1, and is a portion that accepts an instruction from a user.

The power source 18 supplies power to each portion of the digital compound machine 1. Examples of the power source 18 include an AT power source, an ATX power source, and an SFX power source.

The power-source controller 19 is a portion that controls ON and OFF of the power source 18, based on an instruction from the controller 10.

The power-source controller 19 controls the digital compound machine 1 to transition to a sleep state, based on a predetermined sleep state transition condition.

In addition, the power-source controller 19 controls the digital compound machine 1 to the shutoff state, based on a predetermined shutoff transition condition.

The mode setter 20 is a portion that accepts setting whether to execute each type of job in a normal mode or in a silent mode.

Figure 13:
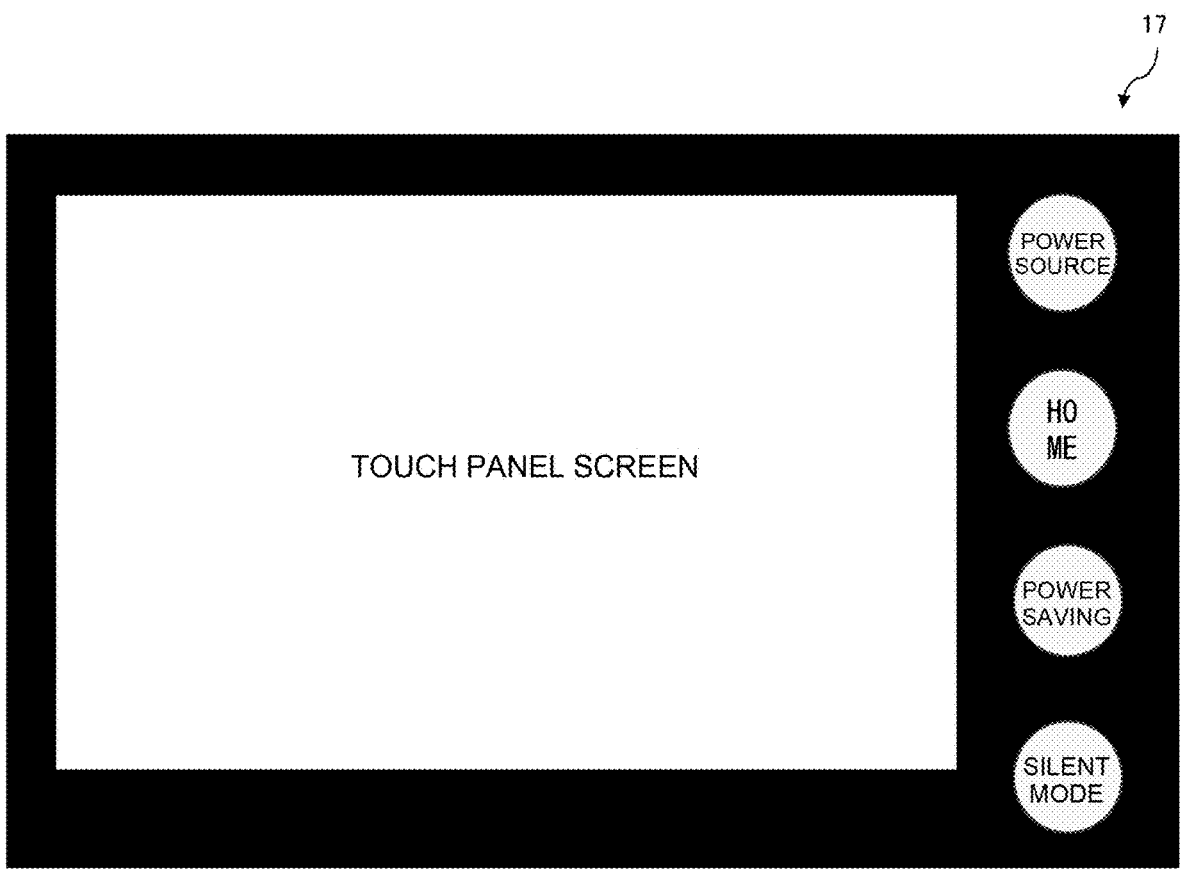
FIG. 13 is an explanatory drawing illustrating an example of an operation panel of a digital compound machine according to a third embodiment of the present disclosure.

As illustrated in FIG. 13, the operation panel 17 may include a power saving key as a hard key, and may be able to switch between enabling and disabling of the power saving mode, by means of pressing of the power saving key.

In addition, the mode setter 20 accepts setting of a time zone for a normal mode and a silent mode, and setting of a standby time and a sleep time in the normal mode and the silent mode.

Figure 3:
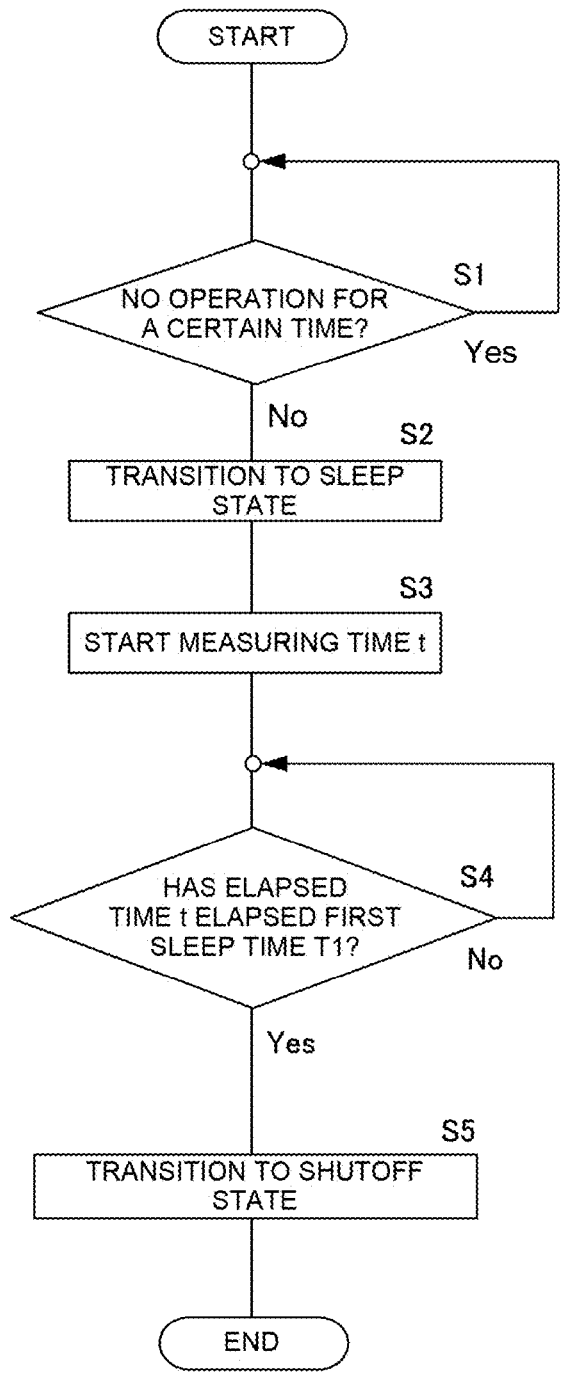
FIG. 3 is a flowchart illustrating an example of automatic shutoff transition processing of the digital compound machine according to the present disclosure in a normal mode.

Automatic Shutoff Transition Processing of Digital Compound Machine 1 in Normal Mode Next, the following describes automatic shutoff transition processing of the digital compound machine 1 in a normal mode, with reference to FIG. 3.

FIG. 3 is an explanatory drawing illustrating an example of the automatic shutoff transition processing of the digital compound machine 1 according to the present disclosure in the normal mode.

In step S1 in FIG. 3, the controller 10 determines whether there is no operation on the operation acceptor 172 for a certain time (step S1).

When there is no operation on the operation acceptor 172 for a certain time (No in the determination in step S1), in step S2, the controller 10 controls the power-source controller 19 to transition to a sleep state (step S2).

Next, in step S3, the controller 10 controls the clock 16 to start measuring an elapsed time t after transition to a sleep state (step S3).

Next, in step S4, the controller 10 determines whether the time t has elapsed a predetermined first sleep time T1 (step S4).

When the time t has elapsed the predetermined first sleep time T1 (Yes in the determination in step S4), in step S5, the controller 10 controls the power-source controller 19 to transition to the shutoff state (step S5), and the processing ends.

Figure 4:
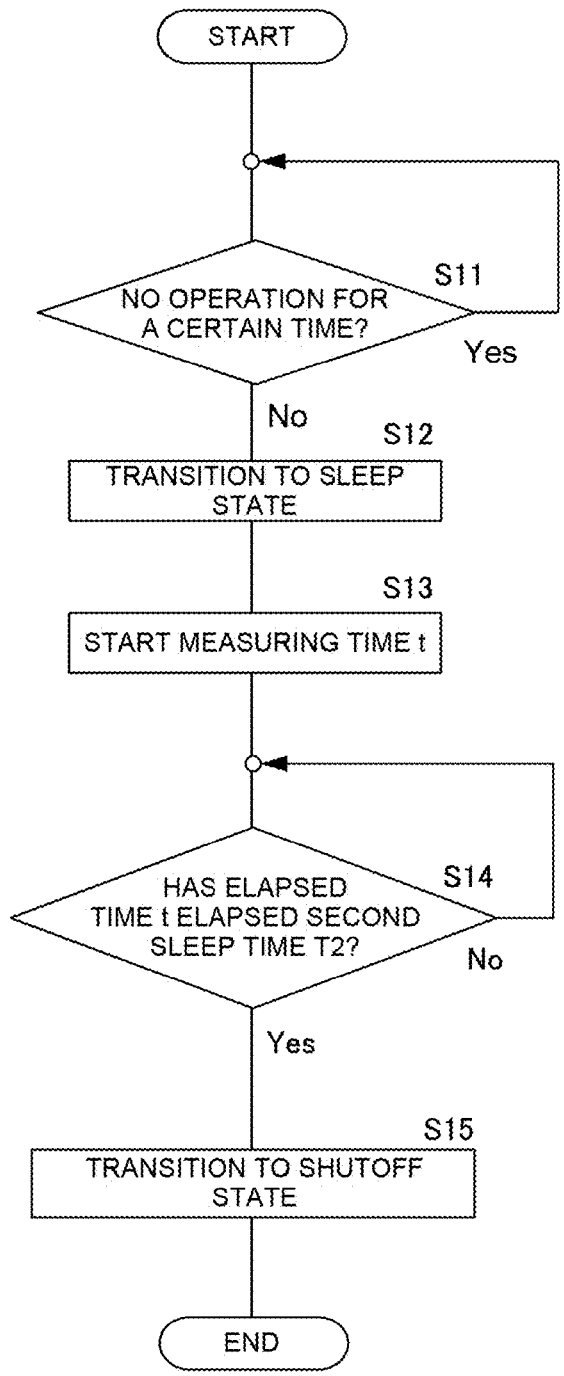
FIG. 4 is a flowchart illustrating an example of automatic shutoff transition processing of the digital compound machine according to the present disclosure in a silent mode.

Automatic Shutoff Transition Processing of Digital Compound Machine 1 in Silent Mode Next, the following describes automatic shutoff transition processing of the digital compound machine 1 in a silent mode, with reference to FIG. 4.

FIG. 4 is an explanatory drawing illustrating an example of automatic shutoff transition processing of the digital compound machine 1 according to the present disclosure in a silent mode.

In step S11 in FIG. 4, the controller 10 determines whether there is no operation on the operation acceptor 172 for a certain time (step S11).

When there is no operation on the operation acceptor 172 for a certain time (No in the determination in step S11), in step S12, the controller 10 controls the power-source controller 19 to transition to a sleep state (step S12).

Next, in step S13, the controller 10 controls the clock 16 to start measuring an elapsed time t after transition to the sleep state (step S13).

Next, in step S14, the controller 10 determines whether the elapsed time t has elapsed a predetermined second sleep time T2 (step S14).

When the elapsed time t has elapsed the second sleep time T2 (Yes in the determination in step S14), in step S15, the controller 10 controls the power-source controller 19 to the shutoff state (step S15), and the processing ends.

Figure 5A:
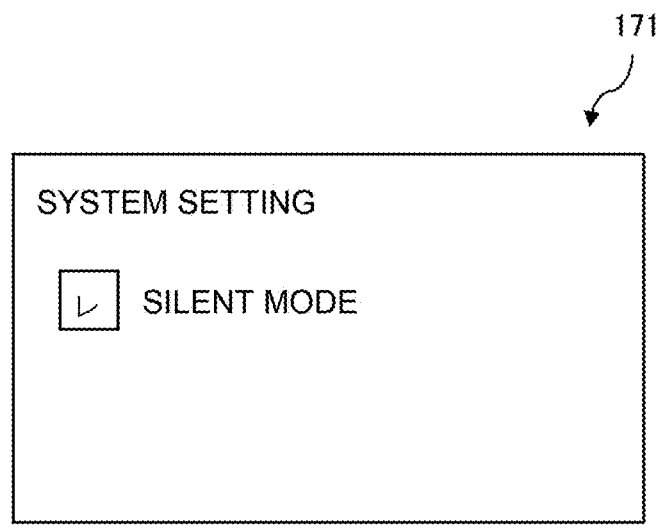
FIGS. 5A and 5B are each an explanatory drawing illustrating an example of a sleep mode setting screen in system setting of the digital compound machine illustrated in FIG. 1.
Figure 5B:
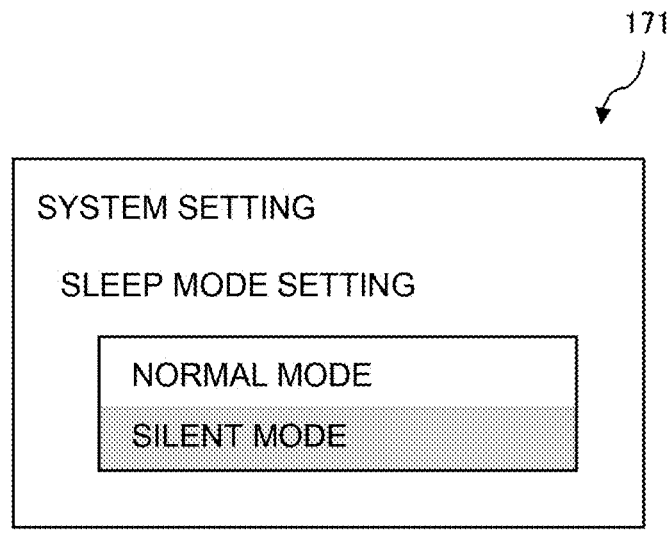

FIGS. 5A and 5B are each an explanatory drawing illustrating an example of a sleep mode setting screen in system setting of the digital compound machine 1 illustrated in FIG. 1.

As illustrated in FIG. 5A, when the silent mode of the digital compound machine 1 is enabled, an item for a silent mode is checked off.

As illustrated in FIG. 5B, a user can select either a normal mode or a silent mode, in sleep mode setting in system setting of the digital compound machine 1.

Figure 6A:
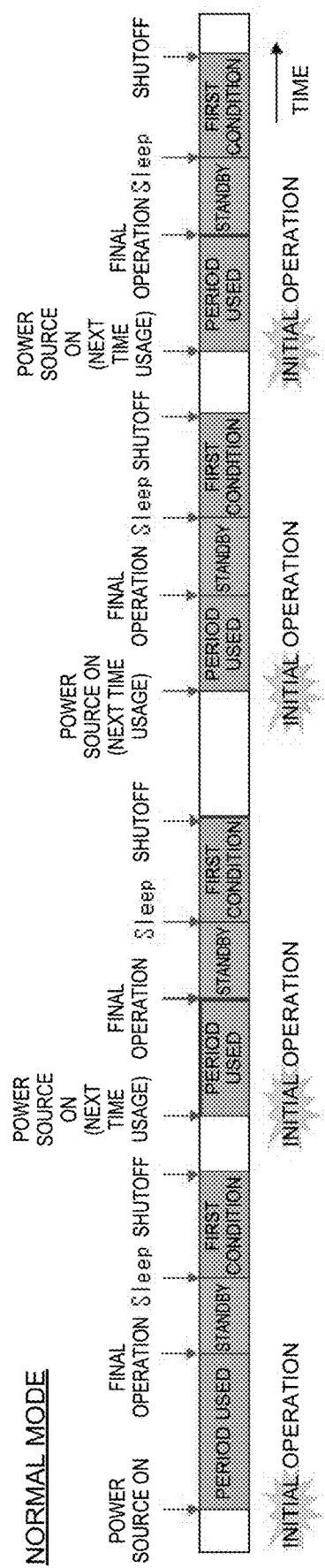
FIG. 6A is an explanatory drawing illustrating an example of automatic shutoff transition processing of the digital compound machine according to the present disclosure in the normal mode, and FIG. 6B an explanatory drawing illustrating an example of automatic shutoff transition processing of the digital compound machine according to the present disclosure in the silent mode.
Figure 6B:
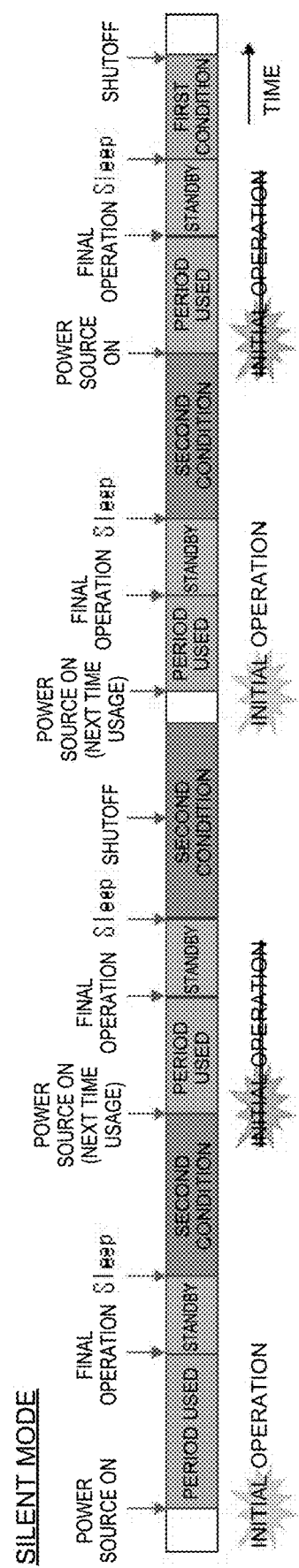

FIG. 6A is an explanatory drawing illustrating an example of automatic shutoff transition processing of the digital compound machine 1 according to the present disclosure in the normal mode, and FIG. 6B is an explanatory drawing illustrating an example of automatic shutoff transition processing of the digital compound machine 1 according to the present disclosure in the silent mode.

FIG. 6A illustrates an example of the automatic shutoff transition processing in the normal mode.

As illustrated in FIG. 6A, when a power source of the digital compound machine 1 is turned ON, the controller 10 controls to perform a predetermined initial operation.

Thereafter, after a final operation after ending of a user usage time, the controller 10 controls the power-source controller 19 to transition to a standby state for a predetermined time and then to a sleep state.

In the normal mode, if an elapsed time has elapsed a first sleep time T1 after transition to a sleep state (first condition), the power-source controller 19 is controlled to transition to the shutoff state.

Thereafter, when the user turns ON the power source of the digital compound machine 1 again, the controller 10 performs an initial operation and activates the digital compound machine 1.

Thereafter, just as previously, transition to the shutoff state is performed after the user usage time, the standby state, and the first condition being satisfied.

FIG. 6B illustrates an example of the automatic shutoff transition processing in the silent mode.

As illustrated in FIG. 6B, when the power source of the digital compound machine 1 is turned ON, the controller 10 performs a predetermined initial operation and activates the digital compound machine 1.

Thereafter, after a final operation after ending of a user usage time, the controller 10 controls the power-source controller 19 to transition to a standby state for a predetermined time and then to a sleep state.

In the silent mode, if an elapsed time has elapsed a second sleep time T2 which is longer than a first sleep time T1 for the normal mode after transition to a sleep state (second condition), the power-source controller 19 is controlled to transition to the shutoff state.

Thereafter, when the user turns ON the power source of the digital compound machine 1 again before the digital compound machine 1 transitions to the shutoff state, the digital compound machine 1 returns from the sleep state without performing an initial operation.

Thereafter, just as previously, transition to the sleep state is performed again after the user usage time and the standby state. However, when the second condition is satisfied, transition to the shutoff state is performed.

In this case, when the user turns ON the power source of the digital compound machine 1 again, the controller 10 performs a predetermined initial operation and activates the digital compound machine 1.

In this way, in the silent mode, the number of times of initial operation attributed to power source being turned ON is reduced, by making a time required to transition from the sleep state to the shutoff state longer than in the normal mode. Accordingly, the number of times of generation of an operating sound attributed to performance of the initial operation at the time of the power source being turned ON is reduced than in conventional cases, and the digital compound machine 1 which is more useful for users than conventionally can be realized.

First Modification

Setting of Time Zone for Silent Mode

Next, the following describes, as a first modification, a setting method of a time zone of a silent mode of the digital compound machine 1 according to the present disclosure, with reference to FIG. 7.

FIG. 7 is an explanatory drawing illustrating an example of a setting screen of a time zone of the silent mode of the digital compound machine 1 according to the present disclosure.

As illustrated in FIG. 7, when the silent mode of the digital compound machine 1 is enabled, an item for a silent mode is checked off.

If an item "ENABLE DEPENDING ON THE TIME ZONE" is checked off, a user can select a day of the week to be enabled, and can set a start time and an ending time of the time zone to be enabled.

Second Modification

Setting of Sleep Time 1

Figure 8:
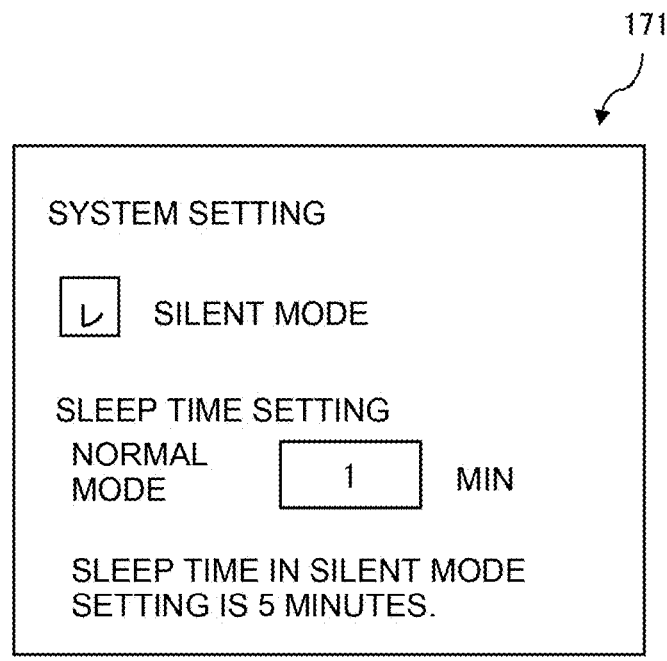
FIG. 8 is an explanatory drawing illustrating an example of a setting screen of a sleep time of the digital compound machine according to the present disclosure.

Next, the following describes, as a second modification, a setting method of a sleep time of the digital compound machine 1 according to the present disclosure, with reference to FIG. 8.

FIG. 8 is an explanatory drawing illustrating an example of a setting screen of a sleep time of the digital compound machine 1 according to the present disclosure.

As illustrated in FIG. 8, when the silent mode of the digital compound machine 1 is enabled, an item for a silent mode is checked off.

If a user sets "one minute" to a sleep time in a normal mode, as sleep time setting, for example, the sleep time in the silent mode setting is automatically set to a longer time ("five minutes" in the example of FIG. 8) than the sleep time in the normal mode.

Third Modification

Setting of Sleep Time 2

Figure 9:
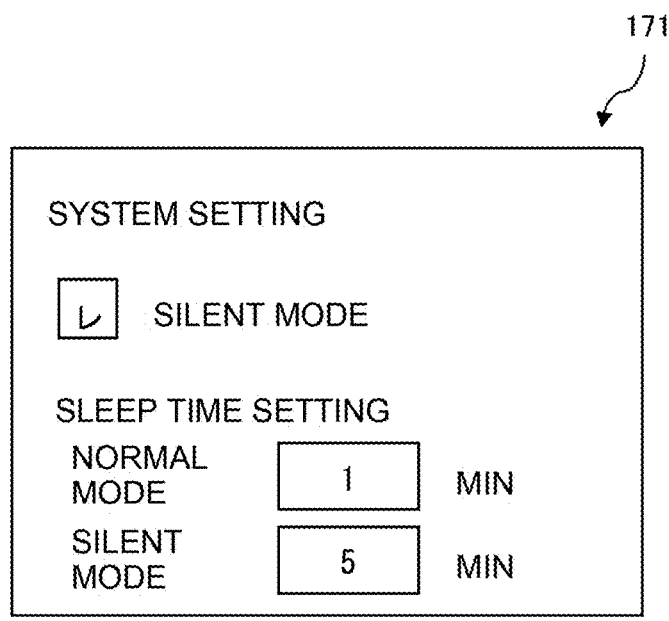
FIG. 9 an explanatory drawing illustrating an other example of the setting screen of the sleep time of the digital compound machine according to the present disclosure.

Next, the following describes, as a third modification, a setting method of a sleep time of the digital compound machine 1 according to the present disclosure, with reference to FIG. 9.

FIG. 9 an explanatory drawing illustrating an other example of the setting screen of the sleep time of the digital compound machine 1 according to the present disclosure.

As illustrated in FIG. 9, when the silent mode of the digital compound machine 1 is enabled, an item for a silent mode is checked off.

A user can set a sleep time for both of a normal mode and a silent mode, as the sleep time setting, on condition that the sleep time of the normal mode is shorter than the sleep time of the silent mode.

For example, if a user sets "one minute" to the sleep time of the normal mode, only a longer time ("five minutes" in the example of FIG. 8) than "one minute" is settable as the sleep time of the silent mode.

On the other hand, for example if a user sets "five minutes" to the sleep time of the silent mode, only a shorter time ("1 minute" in the example of FIG. 8) than "five minutes" is settable as the sleep time of the normal mode.

Fourth Modification

Setting of Condition for Transitioning to Sleep State and Shutoff State Based on Temperature Change of Fuser Next, the following describes, as a fourth modification, a method of setting a condition for transitioning to a sleep mode and a shutoff mode to the digital compound machine 1 according to the present disclosure.

In the fourth modification, the digital compound machine 1 according to the present disclosure further includes a temperature detector not illustrated, and detects an outside air temperature around the digital compound machine 1 and a fusing temperature of the image former 12.

Generally, when the digital compound machine 1 enters the sleep state and energization to a heating circuit of a fuser not illustrated is interrupted, a temperature of the fuser falls as the time elapses, and the temperature change is larger as the outside air temperature is lower.

For this reason, instead of setting the standby time and the sleep time, the condition for transitioning to the sleep state and the shutoff state may be that the fusing temperature has fallen by a certain degree.

Note that as the sleep time gets longer, it takes time to heat the fuser to the fusing temperature again, and the user cannot start printing and has to wait. Therefore, the sleep time may be set taking into consideration the time required for the fusing temperature to reach a predetermined temperature.

In addition, when the outside air temperature is high, the temperature fall of the fuser due to the elapse of time decreases, and the sleep time can be set longer than when the outside air temperature is low.

Second Embodiment

Automatic Shutoff Transition Processing of Digital Compound Machine 1 According to Second Embodiment of the Present Disclosure Next, the following describes automatic shutoff transition processing in the digital compound machine 1 according to a second embodiment of the present disclosure, with reference to FIGS. 10 to 12B.

A configuration of the digital compound machine 1 according to the second embodiment is the same as a configuration of the digital compound machine 1 according to the first embodiment (FIG. 2), and therefore description thereof is omitted.

Figure 10:
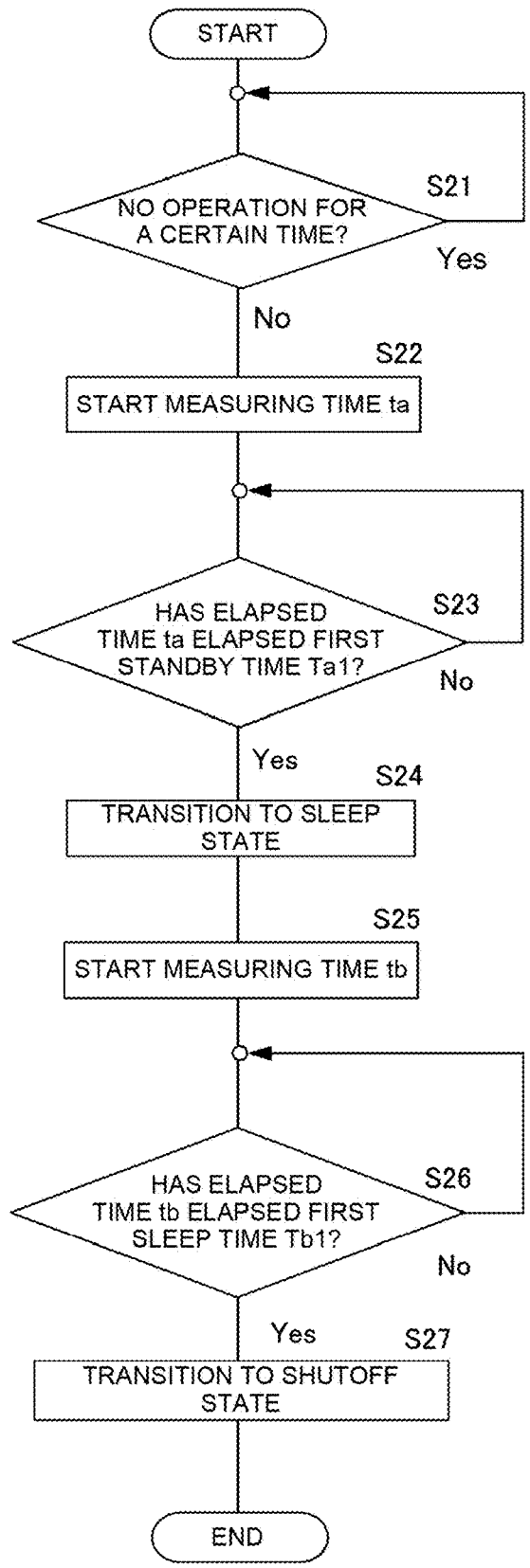
FIG. 10 is a flowchart illustrating an example of automatic shutoff transition processing of a digital compound machine according to a second embodiment of the present disclosure in a normal mode.

FIG. 10 is an explanatory drawing illustrating an example of automatic shutoff transition processing of the digital compound machine 1 according to the second embodiment of the present disclosure in a normal mode.

In step S21 in FIG. 10, the controller 10 determines whether there is no operation on the operation acceptor 172 for a certain time (step S21).

When there is no operation on the operation acceptor 172 for a certain time (No in the determination in step S21), in step S22, the controller 10 controls the clock 16 to start measuring an elapsed time ta after a final operation (step S22).

Next, in step S23, the controller 10 determines whether the elapsed time ta has elapsed a predetermined first standby time Ta1 (step S23).

When the elapsed time ta has elapsed the first standby time Ta1 having been determined (Yes in the determination in step S23), in step S24, the controller 10 controls the power-source controller 19 to transition to the sleep state (step S24).

Next, in step S25, the controller 10 controls the clock 16 to start measuring an elapsed time tb after transition to the sleep state (step S25).

Next, in step S26, the controller 10 determines whether the elapsed time tb has elapsed a predetermined first sleep time Tb1 (step S26).

When the elapsed time tb has elapsed the first sleep time Tb1 (Yes in the determination in step S26), in step S27, the controller 10 controls the power-source controller 19 to transition to the shutoff state (step S27), and the processing ends.

Figure 11:
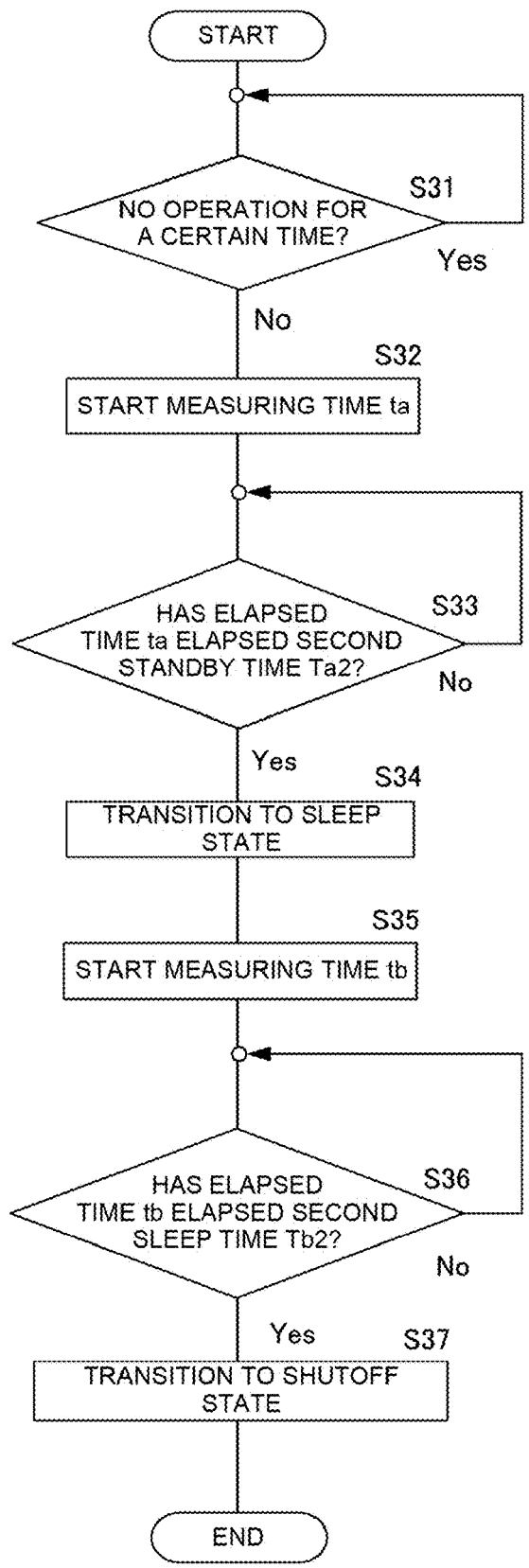
FIG. 11 is a flowchart illustrating an example of automatic shutoff transition processing of the digital compound machine according to the second embodiment of the present disclosure in a silent mode.

Automatic Shutoff Transition Processing of Digital Compound Machine 1 According to Second Embodiment of the Present Disclosure in Silent Mode FIG. 11 is an explanatory drawing illustrating an example of automatic shutoff transition processing of the digital compound machine 1 according to the second embodiment of the present disclosure in a silent mode.

In step S31 in FIG. 11, the controller 10 determines whether there is no operation on the operation acceptor 172 for a certain time (step S31).

When there is no operation on the operation acceptor 172 for a certain time (No in the determination in step S31), in step S32, the controller 10 controls the clock 16 to start measuring the elapsed time tb after a final operation (step S32).

Next, in step S33, the controller 10 determines whether the elapsed time tb has elapsed a second standby time Ta2 (step S33).

Here, the second standby time Ta2 is assumed to be set to a shorter time than the first standby time Ta1.

When the elapsed time tb has elapsed the second standby time Ta2 (Yes in the determination in step S33), in step S34, the controller 10 controls the power-source controller 19 to transition to the sleep state (step S34).

Next, in step S35, the controller 10 controls the clock 16 to start measuring an elapsed time tb after transition to the sleep state (step S35).

Next, in step S36, the controller 10 determines whether the elapsed time tb has elapsed a predetermined second sleep time Tb2 (step S36).

When the elapsed time tb has elapsed the second sleep time Tb2 (Yes in the determination in step S36), in step S37, the controller 10 controls the power-source controller 19 to transition to the shutoff state (step S37), and the processing ends.

FIG. 12A is an explanatory drawing illustrating an example of automatic shutoff transition processing in the normal mode, according to the second embodiment of the present disclosure, and FIG. 12B is an explanatory drawing illustrating an example of automatic shutoff transition processing in the silent mode of the digital compound machine 1, according to the second embodiment of the present disclosure.

FIG. 12A illustrates an example of the automatic shutoff transition processing in the normal mode.

As illustrated in FIG. 12A, when a power source of the digital compound machine 1 is turned ON, the controller 10 performs a predetermined initial operation and activates the digital compound machine 1.

Thereafter, after a final operation after ending of a user usage time, the controller 10 controls the power-source controller 19 to transition to a standby state for a predetermined time.

In the normal mode, when the elapsed time ta has elapsed the first standby time Ta1 after transition to the standby state (first sleep transition condition), the power-source controller 19 is controlled to transition to the sleep state.

Next, when the elapsed time tb has elapsed the first sleep time Tb1 after transition to the sleep state (first shutoff transition condition), the power-source controller 19 is controlled to transition to the shutoff state.

Thereafter, when the user turns ON the power source of the digital compound machine 1 again, the controller 10 performs an initial operation and activates the digital compound machine 1.

Thereafter, just as previously, transition to the sleep state is performed after the user usage time, the standby state, and the first sleep transition condition being satisfied, and transition to the shutoff state is performed after the first shutoff transition condition is satisfied.

FIG. 12B illustrates an example of the automatic shutoff transition processing in the silent mode.

As illustrated in FIG. 12B, when a power source of the digital compound machine 1 is turned ON, the controller 10 performs a predetermined initial operation and activates the digital compound machine 1.

Thereafter, after a final operation after ending of a user usage time, the controller 10 controls the power-source controller 19 to transition to a standby state for a predetermined time.

In the silent mode, when the elapsed time ta has elapsed the second standby time Ta2 which is longer than the first standby time Ta1 after transition to the standby state (second sleep transition condition), the power-source controller 19 is controlled to transition to the sleep state.

Next, when the elapsed time tb has elapsed a second sleep time Tb2 which is longer than the first sleep time Tb1 after transition to the sleep state (second shutoff transition condition), the power-source controller 19 is controlled to transition to the shutoff state.

Thereafter, when the user turns ON the power source of the digital compound machine 1 again before the digital compound machine 1 transitions to the sleep state, the digital compound machine 1 returns from the standby state without performing an initial operation.

Thereafter, just as previously, after the standby state is entered after ending of the user usage time, transition to the sleep state is performed again after the first condition is satisfied. If the second condition is further satisfied, transition to the shutoff state is performed.

Thereafter, when the user turns ON the power source of the digital compound machine 1 again before the digital compound machine 1 transitions to the shutoff state, the digital compound machine 1 returns from the sleep state without performing an initial operation.

In this way, in the silent mode, not only by making a time required to transition from the sleep state to the shutoff state longer than in the normal mode but also by making a time required to transition from the standby state to the sleep state longer than in the normal mode, the number of times of initial operation attributed to power source being turned ON is reduced.

Accordingly, the number of times of generation of an operating sound attributed to performance of the initial operation at the time of the power source being turned ON is reduced than in conventional cases, and the digital compound machine 1 which is more useful for users than conventionally can be realized.

Third Embodiment

Automatic Shutoff Transition Processing of Digital Compound Machine 1 According to Third Embodiment of the Present Disclosure Next, the following describes automatic shutoff transition processing in the digital compound machine 1 according to a third embodiment of the present disclosure, with reference to FIGS. 13 to 16B.

A configuration of the digital compound machine 1 according to the third embodiment is the same as a configuration of the digital compound machine 1 according to the first embodiment (FIG. 2), and therefore description thereof is omitted.

FIG. 13 is an explanatory drawing illustrating an example of an operation panel of the digital compound machine 1 according to the third embodiment of the present disclosure.

As illustrated in FIG. 13, the operation panel 17 of the digital compound machine 1 is provided with a touch panel screen, as a display 171 and an operation acceptor 172 (soft key).

In addition, a power source key, a HOME key, a power saving key, and a silent key are provided next to the touch panel screen, as operation acceptors 172 (hard keys).

Here, the digital compound machine 1 is assumed to enter the power saving priority mode when a user presses the power saving key.

Figure 14:
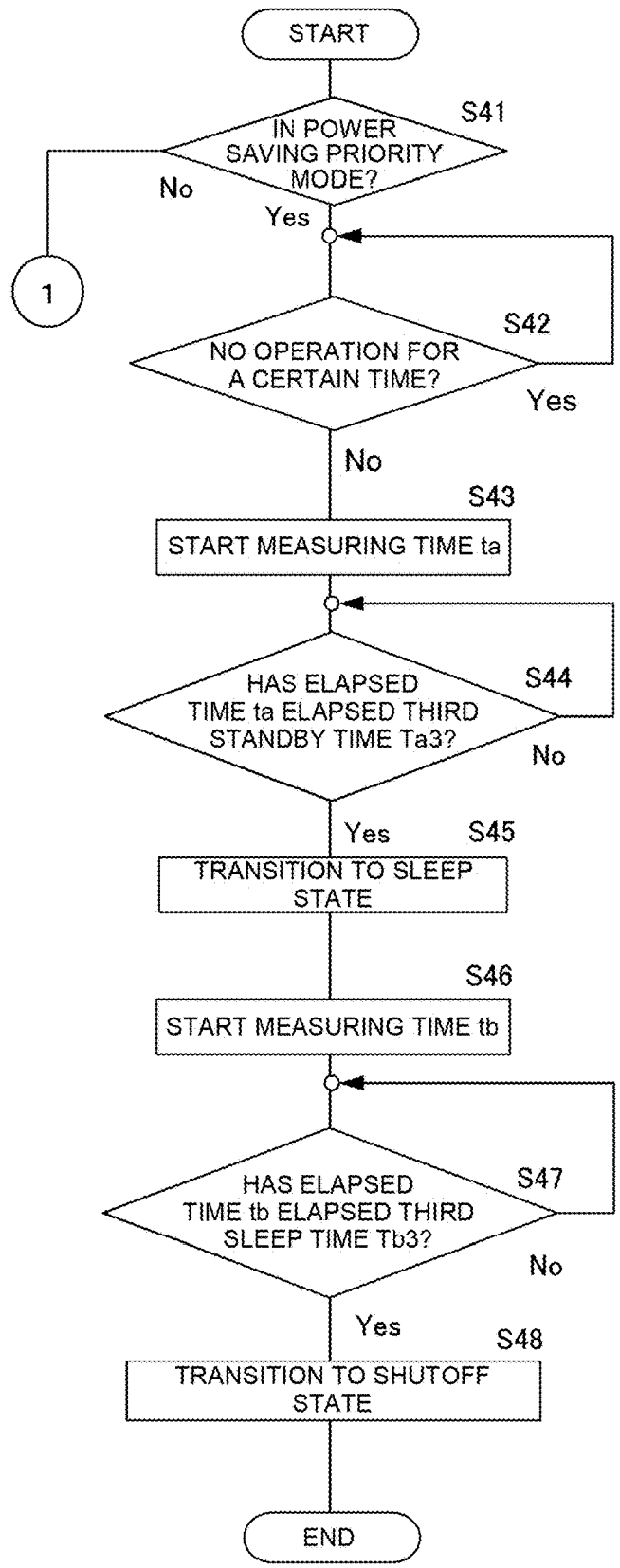
FIG. 14 is a flowchart illustrating an example of automatic shutoff transition processing in a silent mode during a power saving priority mode of the digital compound machine according to the third embodiment of the present disclosure.

FIG. 14 is a flowchart illustrating an example of automatic shutoff transition processing in a silent mode during a power saving priority mode of the digital compound machine 1 according to the third embodiment of the present disclosure.

Figure 15:
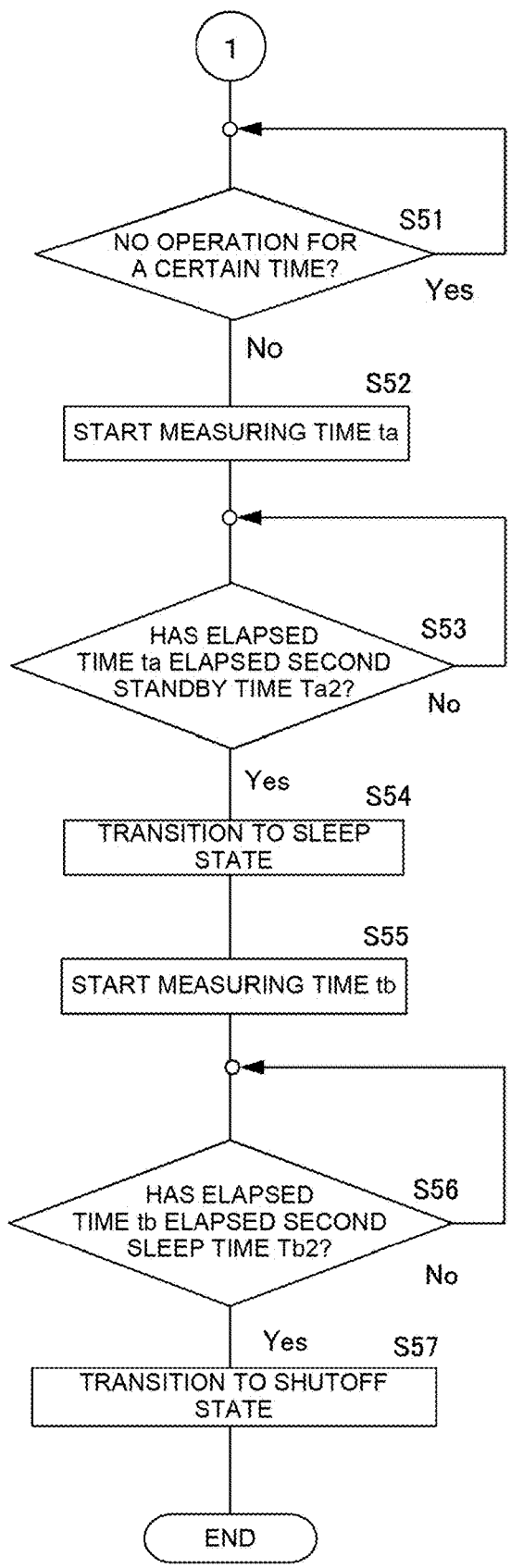
FIG. 15 is a flowchart illustrating an example of automatic shutoff transition processing in a silent mode not during the power saving priority mode of the digital compound machine according to the third embodiment of the present disclosure.

FIG. 15 is a flowchart illustrating an example of automatic shutoff transition processing in a silent mode not during the power saving priority mode of the digital compound machine 1 according to the third embodiment of the present disclosure.

In step S41 in FIG. 14, the controller 10 determines whether the digital compound machine 1 is in the power saving priority mode (step S41).

When the digital compound machine 1 is not in the power saving priority mode (No in the determination in step S41), the controller 10 performs the processing in steps S51 to S57 in FIG. 15.

Note that the processing in steps S51 to S57 in FIG. 15 corresponds to the processing in steps S31 to S37 in FIG. 11 (the second embodiment), respectively, and therefore description thereof is omitted.

On the other hand, when the digital compound machine 1 is in the power saving priority mode (Yes in the determination in step S41), in step S42, the controller 10 determines whether there is no operation on the operation acceptor 172 for a certain time (step S42).

When there is no operation on the operation acceptor 172 for a certain time (No in the determination in step S42), in step S43, the controller 10 controls the clock 16 to start measuring the elapsed time tb after a final operation (step S43).

Next, in step S44, the controller 10 determines whether the elapsed time tb has elapsed a predetermined third standby time Ta3 (step S44).

Here, the third standby time Ta3 is assumed to be set to a shorter time than the second standby time Ta2.

When the elapsed time tb has elapsed the third standby time Ta3 (Yes in the determination in step S44), in step S45, the controller 10 controls the power-source controller 19 to transition to the sleep state (step S45).

Next, in step S46, the controller 10 controls the clock 16 to start measuring an elapsed time tb after transition to the sleep state (step S46).

Next, in step S47, the controller 10 determines whether the elapsed time tb has elapsed a predetermined third sleep time Tb3 (step S47).

Here, the third sleep time Tb3 is assumed to be set to a shorter time than the second sleep time Tb2.

When the elapsed time tb has elapsed the third sleep time Tb3 (Yes in the determination in step S47), in step S48, the controller 10 controls the power-source controller 19 to transition to the shutoff state (step S48), and the processing ends.

Figure 16A:
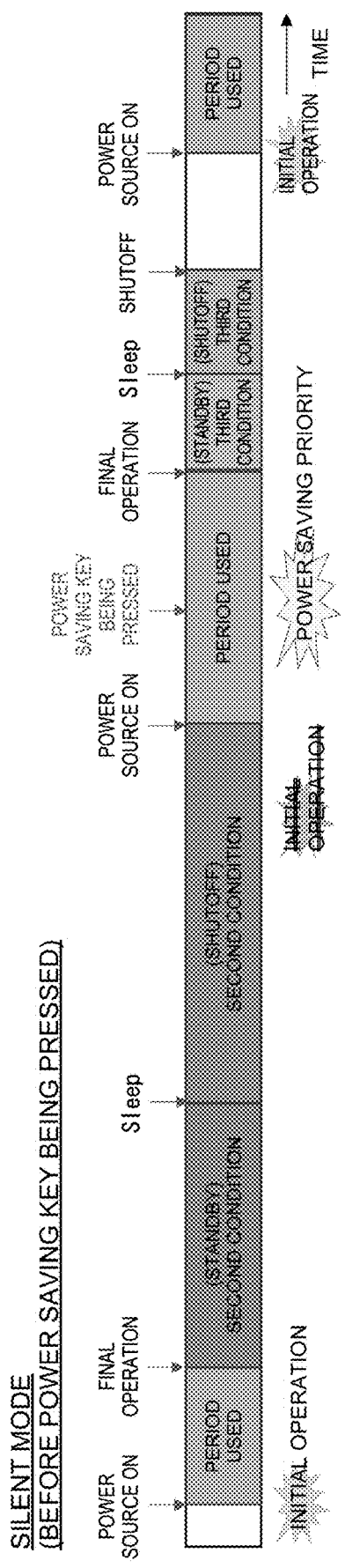
FIGS. 16A and 16B are explanatory drawings illustrating examples of automatic shutoff transition processing in a silent mode before and after pressing of a power saving key of the digital compound machine, respectively, according to the third embodiment of the present disclosure.
Figure 16B:
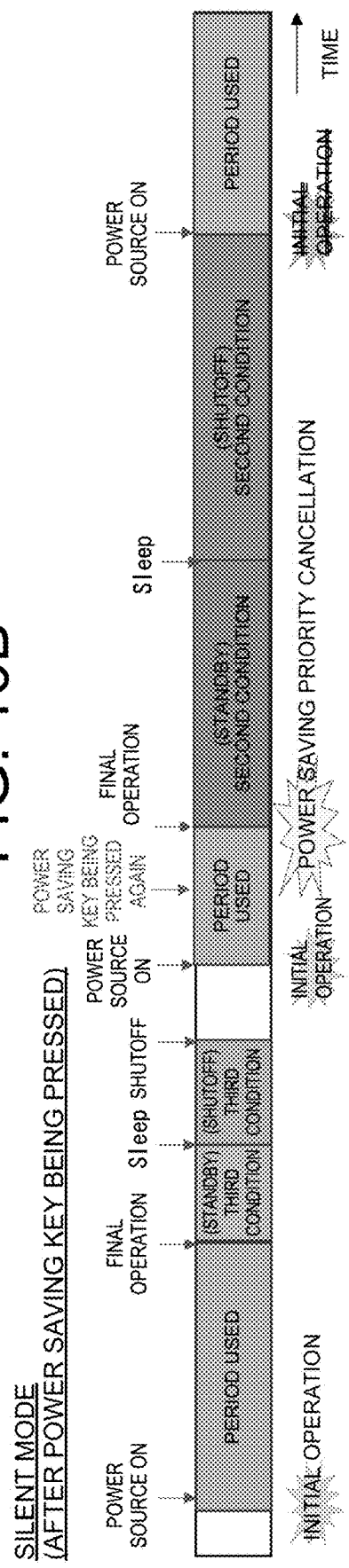

FIGS. 16A and 16B are explanatory drawings illustrating examples of automatic shutoff transition processing in a silent mode before and after pressing of a power saving key of the digital compound machine 1, respectively, according to the third embodiment of the present disclosure.

Note that in FIGS. 16A and 16B, a second standby time Ta2 and a second sleep time Tb2 are assumed to be the same as their counterparts in the first embodiment.

As illustrated in FIG. 16A, when the power source of the digital compound machine 1 is turned ON, the controller 10 performs a predetermined initial operation and activates the digital compound machine 1.

Thereafter, after a final operation after ending of a user usage time, the controller 10 controls the power-source controller 19 to transition to a standby state for a predetermined time.

In the silent mode, when the elapsed time ta has elapsed the second standby time Ta2 after transition to the standby state (second sleep transition condition), the power-source controller 19 is controlled to transition to the sleep state.

Next, when the elapsed time tb has elapsed the second sleep time Tb2 after transition to the sleep state (second shutoff transition condition), the power-source controller 19 is controlled to transition to the shutoff state.

Thereafter, when the user turns ON the power source of the digital compound machine 1 again before the digital compound machine 1 transitions to the shutoff state, the digital compound machine 1 returns from the sleep state without performing an initial operation.

Here, when a user presses the power saving key while using the digital compound machine 1, the digital compound machine 1 enters the power saving priority mode.

Thereafter, after a final operation after ending of a user usage time again, the controller 10 controls the power-source controller 19 to transition to a standby state for a predetermined time.

In the power saving priority mode, when the elapsed time ta has elapsed a third standby time Ta3 which is shorter than the second standby time Ta2 after transition to the standby state (third sleep transition condition), the power-source controller 19 is controlled to transition to the sleep state.

Next, when the elapsed time tb has elapsed the third sleep time Tb3 which is shorter than the second sleep time Tb2 after transition to the sleep state (third shutoff transition condition), the power-source controller 19 is controlled to transition to the shutoff state.

Thereafter, when the user turns ON the power source of the digital compound machine 1 again, the digital compound machine 1 performs an initial operation and is activated from the shutoff state.

On the other hand, as illustrated in FIG. 16B, when the power source of the digital compound machine 1 is turned ON during the power saving priority mode, the controller 10 performs a predetermined initial operation and activates the digital compound machine 1.

Thereafter, after a final operation after ending of a user usage time, the controller 10 controls the power-source controller 19 to transition to a standby state for a predetermined time.

In the power saving priority mode, when the elapsed time ta has elapsed the third standby time Ta3 after transition to the standby state (third sleep transition condition), the power-source controller 19 is controlled to transition to the sleep state.

Next, when the elapsed time tb has elapsed the third sleep time Tb3 after transition to the sleep state (third shutoff transition condition), the power-source controller 19 is controlled to transition to the shutoff state.

Thereafter, when the user turns ON the power source of the digital compound machine 1 again, the digital compound machine 1 performs an initial operation and is activated from the shutoff state.

Here, when the user presses the power saving key again while using the digital compound machine 1, the power saving priority mode of the digital compound machine 1 is cancelled.

Thereafter, after a final operation after ending of a user usage time again, the controller 10 controls the power-source controller 19 to transition to a standby state for a predetermined time.

In the power saving priority mode, when the elapsed time ta has elapsed the second standby time Ta2 after transition to the standby state (second sleep transition condition), the power-source controller 19 is controlled to transition to the sleep state.

Next, when the elapsed time tb has elapsed the second sleep time Tb2 after transition to the sleep state (second shutoff transition condition), the power-source controller 19 is controlled to transition to the shutoff state.

Thereafter, when the user turns ON the power source of the digital compound machine 1 again before the digital compound machine 1 transitions to the shutoff state, the digital compound machine 1 returns from the sleep state without performing an initial operation.

In this way, when a user has enabled the power saving priority mode, not only the time required to transition from the sleep state to the shutoff state but also the time required to transition from the standby state to the sleep state are shortened even in the silent mode. Therefore, the digital compound machine 1 which is more useful for users than conventionally can be realized.

Fourth Embodiment

Figure 17:
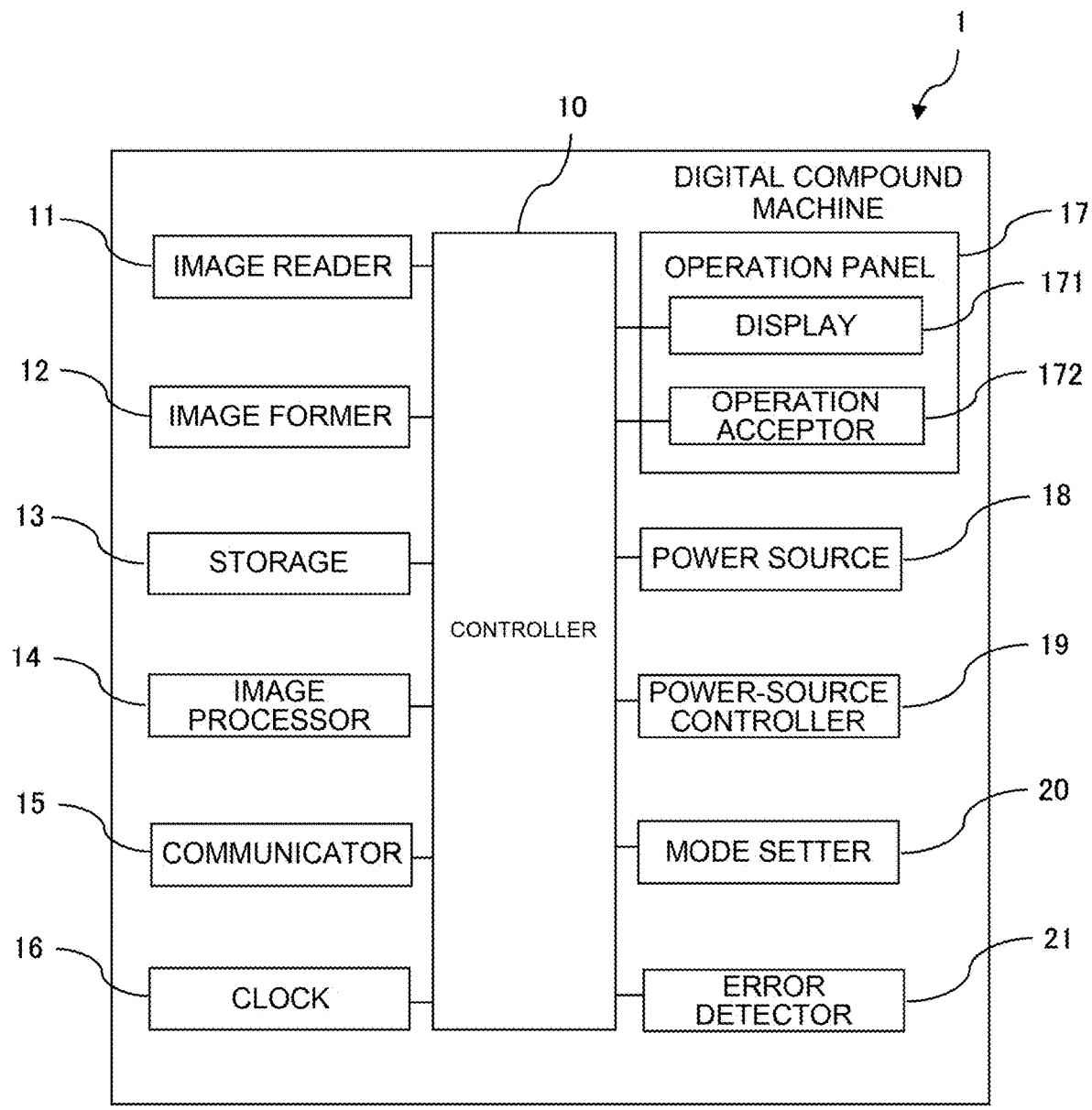
FIG. 17 is a block diagram illustrating an outline of a configuration of a digital compound machine according to a fourth embodiment of the present disclosure.
Figure 18:
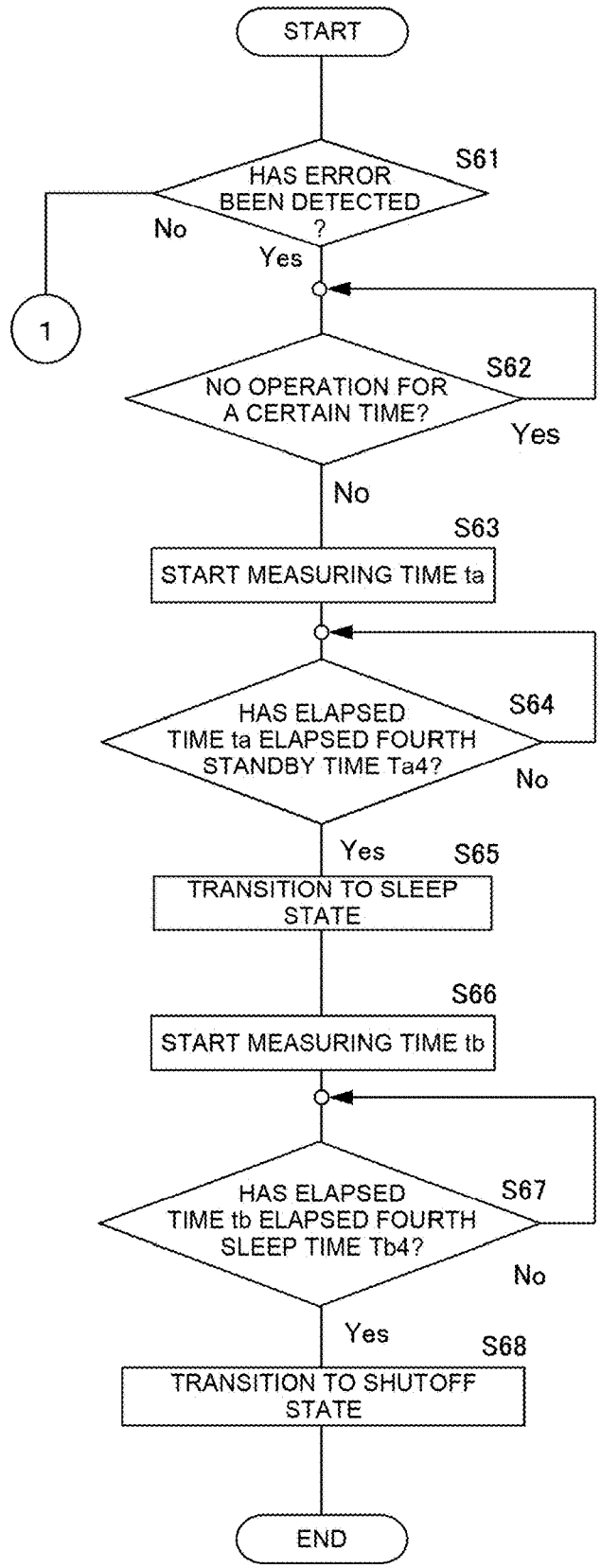
FIG. 18 is a flowchart illustrating an example of automatic shutoff transition processing in a silent mode after an error occurrence in the digital compound machine according to the fourth embodiment of the present disclosure.
Figure 19:
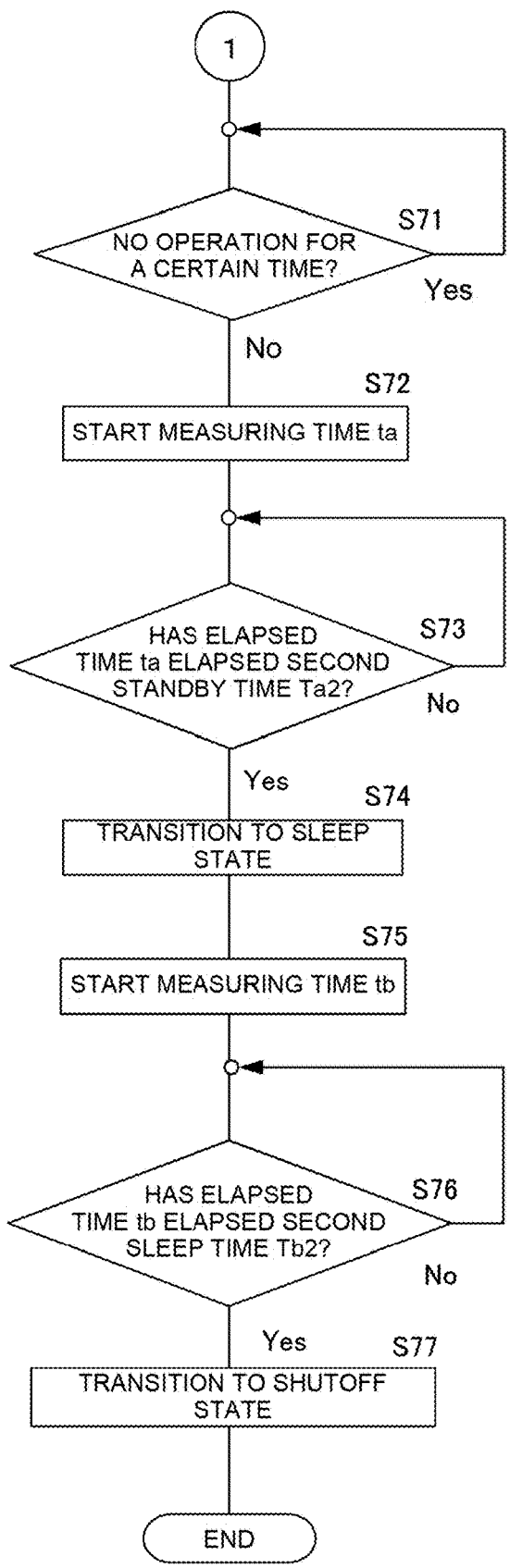
FIG. 19 is a flowchart illustrating an example of automatic shutoff transition processing in a silent mode when no error has occurred in the digital compound machine according to the fourth embodiment of the present disclosure.

Automatic Shutoff Transition Processing of Digital Compound Machine 1 According to Fourth Embodiment of the Present Disclosure Next, the following describes automatic shutoff transition processing in the digital compound machine 1 according to a fourth embodiment of the present disclosure, with reference to FIGS. 17 to 19.

FIG. 17 is a block diagram illustrating an outline of a configuration of a digital compound machine 1 according to a fourth embodiment of the present disclosure.

As illustrated in FIG. 17, a configuration of the digital compound machine 1 according to the fourth embodiment is the same as a configuration of the digital compound machine 1 according to the first embodiment (FIG. 2), except that the digital compound machine 1 according to the fourth embodiment includes an error detector 21.

The error detector 21 is a portion that detects an error occurring in each portion of the digital compound machine 1.

The error detector 21 detects such an error occurrence as jam occurrence, out of ink toner, paper jam occurrence, out of paper, opening of a predetermined door of the main body.

FIG. 18 is a flowchart illustrating an example of automatic shutoff transition processing in a silent mode after an error occurrence in the digital compound machine 1 according to the fourth embodiment of the present disclosure.

FIG. 19 is a flowchart illustrating an example of automatic shutoff transition processing in a silent mode when no error has occurred in the digital compound machine 1 according to the fourth embodiment of the present disclosure.

In step S61 in FIG. 18, the controller 10 determines whether the error detector 21 has detected a predetermined error (step S61).

In this case, the types of errors may be limited to be errors against which an initial operation is required for the next activation of the digital compound machine 1, such as jam occurrence or the like.

When the error detector 21 has not detected a predetermined error (No in the determination in step S61), the controller 10 performs the processing in steps S71 to S77 in FIG. 19.

Note that the processing in steps S71 to S77 in FIG. 19 corresponds to the processing in steps S31 to S37 in FIG. 11 (the second embodiment), respectively, and therefore description thereof is omitted.

On the other hand, when the error detector 21 has detected a predetermined error (Yes in the determination in step S61), in step S62, the controller 10 determines whether there is no operation on the operation acceptor 172 for a certain time (step S62).

When there is no operation on the operation acceptor 172 for a certain time (No in the determination in step S62), in step S63, the controller 10 controls the clock 16 to start measuring the elapsed time tb after a final operation (step S63).

Next, in step S64, the controller 10 determines whether the elapsed time tb has elapsed a predetermined fourth standby time Ta4 (step S64).

Here, the fourth standby time Ta4 is assumed to be set to a shorter time than the second standby time Ta2.

When the elapsed time tb has elapsed the fourth standby time Ta4 (Yes in the determination in step S64), in step S65, the controller 10 controls the power-source controller 19 to transition to the sleep state (step S65).

Next, in step S66, the controller 10 controls the clock 16 to start measuring an elapsed time tb after transition to the sleep state (step S66).

Next, in step S67, the controller 10 determines whether the elapsed time tb has elapsed a predetermined fourth sleep time Tb4 (step S67).

Here, the fourth sleep time Tb4 is assumed to be set to a shorter time than the second sleep time Tb2.

When the elapsed time tb has elapsed the fourth sleep time Tb4 (Yes in the determination in step S67), in step S68, the controller 10 controls the power-source controller 19 to transition to the shutoff state (step S68), and the processing ends.

Figure 20:
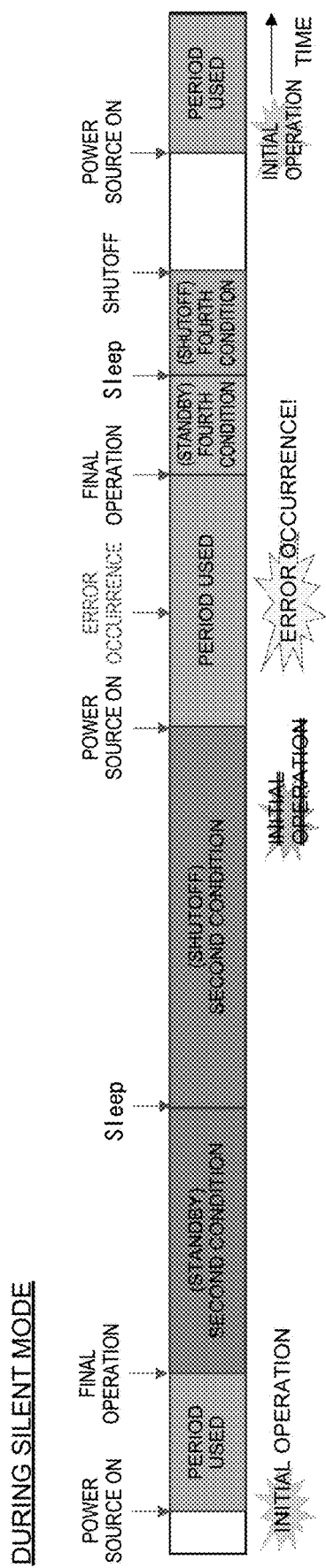
FIG. 20 is an explanatory drawing illustrating an example of automatic shutoff transition processing in a silent mode after an error occurrence in the digital compound machine according to the fourth embodiment of the present disclosure.

FIG. 20 is an explanatory drawing illustrating an example of automatic shutoff transition processing in a silent mode after an error occurrence in the digital compound machine 1 according to the fourth embodiment of the present disclosure.

Note that in FIG. 20, the second standby time Ta2 and the second sleep time Tb2 are assumed to be the same as their counterparts in the first embodiment.

As illustrated in FIG. 20, when the power source of the digital compound machine 1 is turned ON, the controller 10 performs a predetermined initial operation and activates the digital compound machine 1.

Thereafter, after a final operation after ending of a user usage time, the controller 10 controls the power-source controller 19 to transition to a standby state for a predetermined time.

In the silent mode, when the elapsed time ta has elapsed the second standby time Ta2 after transition to the standby state (second sleep transition condition), the power-source controller 19 is controlled to transition to the sleep state.

Next, when the elapsed time tb has elapsed the second sleep time Tb2 after transition to the sleep state (second shutoff transition condition), the power-source controller 19 is controlled to transition to the shutoff state.

Thereafter, when the user turns ON the power source of the digital compound machine 1 again before the digital compound machine 1 transitions to the shutoff state, the digital compound machine 1 returns from the sleep state without performing an initial operation.

Here, when a predetermined error occurs while a user uses the digital compound machine 1, the digital compound machine 1 enters the silent mode after the error occurrence.

Thereafter, after a final operation after ending of a user usage time again, the controller 10 controls the power-source controller 19 to transition to a standby state for a predetermined time.

In the silent mode after the error occurrence, if the elapsed time ta has elapsed the fourth standby time Ta4 which is shorter than the second standby time Ta2 after transition to the standby state (fourth sleep transition condition), the power-source controller 19 transitions to the sleep state.

Next, when the elapsed time tb has elapsed the fourth sleep time Tb4 which is shorter than the second sleep time Tb2 after transition to the sleep state (fourth shutoff transition condition), the power-source controller 19 is controlled to transition to the shutoff state.

Thereafter, when the user turns ON the power source of the digital compound machine 1 again, the digital compound machine 1 performs an initial operation and is activated from the shutoff state.

In this way, when a predetermined error has occurred, not only the time required to transition from the sleep state to the shutoff state but also the time required to transition from the standby state to the sleep state are shortened even in the silent mode. Therefore, the digital compound machine 1 which is more useful for users than conventionally can be realized.

Preferred embodiments of the present disclosure include any combination of the above-described plurality of embodiments.

Not limited to the above-described embodiments, the present disclosure may include various modifications. Such modifications should not to be construed not to belong to the scope of the present disclosure. The present disclosure should include all the modifications having meanings equivalent to those of the scope of claims and falling within the above-mentioned scope.

While there have been described what are at present considered to be certain embodiments of the invention, it will be understood that various modifications may be made thereto, and it is intended that the appended claim cover all such modifications as fall within the true spirit and scope of the invention.

What is claimed is:

1. An image forming apparatus comprising:
   an operation acceptor that accepts an operation from a user;
   an image former that has, to be switchable, two image formation modes that are a normal mode in which image formation is performed at a predetermined speed and a silent mode in which image formation is performed more silently than in the normal mode;
   one or more controllers that control the image former; and
   one or more power-source controllers that control a power source from which power is supplied to the image former and the controllers,
   the power-source controllers transitioning to a predetermined sleep state when the operation acceptor has not accepted an operation for a predetermined standby time, and after transitioning to the sleep state, transitioning to a predetermined shutoff state when the operation acceptor has not accepted an operation for a predetermined sleep time, wherein
   after transition to the sleep state is caused during the normal mode, the controllers control the power-source controllers to transition to the shutoff state when a predetermined first sleep time has elapsed, and
   after transitioning to the sleep state during the silent mode, the controllers control the power-source controllers to transition to the shutoff state when a predetermined second sleep time which is longer than the first sleep time has elapsed.

2. The image forming apparatus according to claim 1, wherein
   the controllers control the power-source controllers to transition to the sleep state when the operation acceptor has not accepted an operation for a predetermined first standby time during the normal mode, and the controllers control the power-source controllers to transition to the sleep state when the operation acceptor has been on standby for a predetermined second standby time which is longer than the first standby time during the silent mode.

3. The image forming apparatus according to claim 2, further comprising:

a mode setter that accepts setting of the normal mode and the silent mode, wherein the controllers control the mode setter to set the second standby time which is longer than the first standby time by a predetermined time when the mode setter has accepted setting of the first standby time, and control the mode setter to set the first standby time which is shorter than the second standby time by a predetermined time when the mode setter has accepted setting of the second standby time.

4. The image forming apparatus according to claim 2, further comprising:

a mode setter that accepts setting of the normal mode and the silent mode, wherein the controllers control the mode setter to be able to accept setting of only the second standby time which is longer than the first standby time by a predetermined time when the mode setter has accepted setting of the first standby time, and control the mode setter to be able to accept setting of only the first standby time which is shorter than the second standby time by a predetermined time when the mode setter has accepted setting of the second standby time.

5. The image forming apparatus according to claim 1, further comprising:

a mode setter that accepts setting of the normal mode and the silent mode, wherein the controllers control the mode setter to set the second sleep time which is longer than the first sleep time by a predetermined time when the mode setter has accepted setting of the first sleep time, and control the mode setter to set the first sleep time which is shorter than the second sleep time by a predetermined time when the mode setter has accepted setting of the second sleep time.

6. The image forming apparatus according to claim 1, further comprising:

a mode setter that accepts setting of the normal mode and the silent mode, wherein the controllers control the mode setter to be able to accept setting of only the second sleep time which is longer than the first sleep time by a predetermined time when the mode setter has accepted setting of the first sleep time, and control the mode setter to be able to accept setting of only the first sleep time which is shorter than the second sleep time by a predetermined time when the mode setter has accepted setting of the second sleep time.

7. The image forming apparatus according to claim 1, wherein the operation acceptor includes a power saving key that accepts a predetermined power saving priority instruction, and when the power saving priority instruction is accepted during the silent mode, the controllers control the power-source controllers to transition to the shutoff state when a predetermined third sleep time which is shorter than the first sleep time has elapsed after transitioning to the sleep state.

8. The image forming apparatus according to claim 1, further comprising:

an error detector that detects an error of the image former, wherein when the error detector has detected a predetermined error, the controllers control the power-source controllers to transition to the shutoff state when a predetermined fourth sleep time which is shorter than the first sleep time has elapsed after transitioning to the sleep state.

* * * * *